(12) United States Patent
Blickley et al.

(10) Patent No.: US 7,878,431 B2
(45) Date of Patent: Feb. 1, 2011

(54) SEPARATOR ROTARY FEEDER AND METHOD OF USING THE SAME

(75) Inventors: William J. Blickley, Scott Depot, WV (US); Randall L. Force, Charleston, WV (US); David M. Gaines, St. Albans, WV (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 12/809,153

(22) PCT Filed: Dec. 17, 2008

(86) PCT No.: PCT/US2008/013775

§ 371 (c)(1),
(2), (4) Date: Jun. 18, 2010

(87) PCT Pub. No.: WO2009/085162

PCT Pub. Date: Jul. 9, 2009

(65) Prior Publication Data

US 2010/0264243 A1    Oct. 21, 2010

Related U.S. Application Data

(60) Provisional application No. 61/008,868, filed on Dec. 20, 2007.

(51) Int. Cl.
*B02C 19/00* (2006.01)
(52) U.S. Cl. .............................. 241/19; 241/60; 241/73; 241/79.1; 222/170; 222/367; 406/62
(58) Field of Classification Search .................. 241/19, 241/30, 60, 79.1, 73; 222/170, 367; 406/62
See application file for complete search history.

(56) References Cited

U.S. PATENT DOCUMENTS

| 1,536,124 | A | 5/1925 | Moore et al. |
|---|---|---|---|
| 1,693,754 | A | 12/1928 | Henry |
| 2,992,740 | A | 7/1961 | Phippen |
| 3,151,784 | A | 10/1964 | Tailor |
| 3,201,007 | A | 8/1965 | Transeau |
| 4,076,150 | A | 2/1978 | Didrickson |
| 4,155,486 | A | 5/1979 | Brown |
| 4,164,947 | A | 8/1979 | Wilson |
| 4,231,495 | A | 11/1980 | Lund |

(Continued)

*Primary Examiner*—Mark Rosenbaum (57) ABSTRACT

A rotary feeder for feeding a particulate material including: a cylindrical housing comprising a feeder inlet, a first feeder outlet, and a second feeder outlet; a rotor mounted in the cylindrical housing including a plurality of substantially impeller blades defining a plurality of circumferentially spaced pockets alignable with the feeder inlet, first feeder outlet, and second feeder outlet, and adapted to sweep a wall of the cylindrical housing as the rotor rotates in the cylindrical housing; a device for rotating the rotor; and a separating screen in the first feeder outlet to substantially prevent oversize material from exiting through the first feeder outlet, wherein each of the plurality of circumferentially spaced pockets will align with the feeder inlet to receive therein a particulate material and an oversize material through the feeder inlet, rotate in the cylindrical housing to align with the first feeder outlet and discharge the particulate material therefrom, and rotate in the cylindrical housing to align with the second feeder outlet after alignment with the first feeder outlet and discharge the oversized material therefrom is provided as well as a method of using the same.

28 Claims, 5 Drawing Sheets

U.S. PATENT DOCUMENTS

| | | |
|---|---|---|
| 4,461,700 A | 7/1984 | Lahtinen |
| 4,536,121 A | 8/1985 | Stewart et al. |
| 4,635,862 A | 1/1987 | West et al. |
| 4,834,783 A | 5/1989 | El Saie |
| 4,940,131 A | 7/1990 | Swartz |
| 4,993,647 A | 2/1991 | Williams |
| 5,725,332 A | 3/1998 | Harper et al. |
| 6,277,162 B1 | 8/2001 | Hoecker |
| 6,669,411 B2 | 12/2003 | Salley, Jr. |
| 7,083,069 B2 | 8/2006 | Wysong et al. |
| 7,112,120 B2 | 9/2006 | Rivir et al. |

Fig. 3A (top view)

Fig. 3B (side view)

Fig. 3C (side view)

Fig. 3D (end view)

Fig. 3E (end view)

Fig. 3F (end view)

Fig. 3G (end view)

Fig. 4 (top view)

Fig. 5 (top view)

Fig. 7 (top view)

Fig. 6 (top view)

Fig. 8 (top view)

Fig. 9

SEPARATOR ROTARY FEEDER AND METHOD OF USING THE SAME

CROSS REFERENCE TO RELATED APPLICATIONS

This application is a National Stage entry under 36 U.S.C. 371 of International Application No. PCT/US2008/013775, filed Dec. 17, 2008, and claims the benefit of Ser. No. 61/008,868, filed Dec. 20, 2007, the disclosure of which is incorporated by reference.

FIELD OF THE INVENTION

This disclosure generally relates to a device and method for feeding a particulate material. More specifically this disclosure relates to using a rotary feeder to feed a particulate material into a material handling system. This disclosure also generally relates to a device and method for separating particulate material in a rotary feeder.

BACKGROUND

Many materials, such as plastics, wood chips, grain, shredded garbage, particulate-form products, and like divided materials, are handled in materials handling equipment using rotary air-lock meters or rotary feeders. For example, the divided material may be fed to other solids handling equipment, such as mixers, blenders, or process vessels of various types. To prevent the escape of pressurized gas out, or air into a conveying line or other processing device, the divided material may be fed into the conveying line or to other systems by means of a rotary air-lock device. Other applications may use a rotary feeder to meter the flow of material.

Typically, such devices comprise a top inlet over a cylindrical housing, and a bottom outlet. Mounted in the housing is a rotor comprising a plurality of blades adapted to engage the periphery of the housing and to form with the housing as they rotate sealed chambers for conveying material from an inlet to the outlet. In many systems, the divided materials are fed by gravity into the upper portion of the feeder. In some designs, the upper edge of the housing is provided with a shearing surface that, with the edge of a rotor blade, forms a shear to cut off material projecting beyond the edge of a rotor blade as it rotates beneath the surface.

In some systems, the rotary air-lock feeder feeds a combination of particulate material and oversized material to pneumatic conveying systems, where the combination of materials are transported to other materials processing equipment, or may drop the combination of particulate material and oversized material into a gravity flow material processing system.

In some processes, it may be necessary to remove oversize material from the divided particulate material before the combination of particulate material and oversized material is fed to materials processing equipment or systems. This may be required, for example, to prevent product contamination or prevent interference with the operation of other downstream equipment. In some processes, for example polymer manufacturing, the divided polymer particulate material may be conveyed to metering devices or feed controllers, such as weigh belt devices, screw feeders, or other devices, that are prone to malfunction if oversize materials enter the device. For whatever reason, it is often advantageous to remove oversize material from the divided particulate material, particularly before transferring the material to the metering or feed device. This typically requires the installation of a separate piece of equipment before the metering or feed device to screen out the oversize material.

One such device may be, for example, a vibrating screener wherein the combination of particulate material and oversize material is fed to a screen that is on an incline and vibrating. The particulate material falls through the screen while the oversize material travels over the top of the screen to a disposal port. The screening device can become large, and as in the case of the vibrating screener, may impart vibrations to the supporting structure. The vibrations may interfere with the operations of precision solids metering or feed devices. Furthermore, because these materials handling systems are often gravity feed systems, the installation of a screener may also increase the vertical height of the materials handling system, increasing construction costs and complicating structural designs.

For example, U.S. Pat. No. 4,231,495 discloses a rotary air-lock feeder for a pneumatic conveying line that includes a cylindrical housing with a straight bladed rotor mounted therein to propel materials from an upper inlet to a bottom discharge.

U.S. Pat. No. 4,940,131 discloses a rotary valve having an elevated device for holding a supply of the particulate material, a lower material receiving device and a remote control device. A slide valve disposed in the inlet controls the flow of material therethrough.

U.S. Pat. No. 4,076,150 discloses a rotary air lock having an inlet, an outlet, and adjustable blades to maintain a seal.

U.S. Pat. No. 6,669,411 discloses a rotary air lock feeder having a rotor positioned within a cylinder, and hopper connected with the cylinder through a slotted inlet located in an upper portion of the cylinder.

Other background references include U.S. Pat. Nos. 1,536,124, 2,992,740, 3,151,784, 3,201,007, 4,155,486, 4,164,947, 4,461,700, 4,536,121, 4,635,862, 4,834,783, 4,993,647, 5,725,332, 7,083,069, and 7,112,120.

There exists a need for a device that may remove oversize material without imparting appreciable vibrations to a structure and that does not significantly increase the vertical height of a materials handling system. It would also be advantageous to combine the function of a rotary feeder, for example a rotary air-lock feeder, with the function of removing oversize material from the particulate material into a single piece of equipment that does not produce significant vibration.

SUMMARY

In several classes of embodiments, the invention comprises a device and method for feeding a particulate material while also separating oversized material that may be contained in the particulate material from the particulate material. In a class of embodiments, the disclosure comprises a rotary feeder device and method of using a rotary feeder device for feeding a particulate material while separating an oversized material from the particulate material.

One class of embodiments comprises a rotary feeder for feeding a particulate material comprising: a cylindrical housing comprising a feeder inlet, a first feeder outlet, and a second feeder outlet; a rotor mounted in the cylindrical housing comprising a plurality of impeller blades defining a plurality of circumferentially spaced pockets alignable with the feeder inlet, first feeder outlet, and second feeder outlet, and adapted to sweep a wall of the cylindrical housing as the rotor rotates in the cylindrical housing; a device for rotating the rotor; and a separating screen in the first feeder outlet to substantially prevent oversize material from exiting through the first feeder outlet, wherein each of the plurality of circumferentially spaced pockets will align with the feeder inlet to receive therein a particulate material and an oversize material through the feeder inlet, rotate in the cylindrical housing to align with the first feeder outlet and discharge the particulate material therefrom, and rotate in the cylindrical housing to align with the second feeder outlet after alignment with the first feeder outlet and discharge the oversized material therefrom.

In one embodiment, the separating screen comprises a bar grate.

In at least one embodiment, a screen length in the direction of rotation is at least about 1.5 times a tip-to-tip distance between any two rotor tips on the plurality of radially disposed blades.

In at least one other embodiment, a second outlet length in the direction of rotation is at least about 1.0 times the tip-to-tip distance.

At least one embodiment comprises a first shear surface on the cylindrical housing at the feeder inlet of for engagement with the edges of the impeller blades as the impeller rotates in a first direction, a second shear surface on the cylindrical housing at the feeder inlet for engagement with the edges of the impeller blades as the impeller rotates in a second direction, or a combination thereof.

At least one embodiment further comprises a third shear surface on the cylindrical housing at the first feeder outlet for engagement with the edges of the impeller blades as the impeller rotates in a first direction, a fourth shear surface on the cylindrical housing at the first feeder outlet for engagement with the edges of the impeller blades as the impeller rotates in a second direction, or a combination thereof.

In at least one embodiment, the separating screen comprises a bar grate comprising a series of parallel bars aligned in the same direction as the rotor rotates.

In at least one embodiment, the parallel bars comprise at least one of nodules and serrations on an upper surface thereof.

In at least one embodiment, the bar grate further comprises bars aligned transverse to the direction of rotor rotation.

In at least one embodiment, the parallel bars have a cross-sectional shape comprising at least one of pentagonal, rhomboidal, diamond, and kite, and are oriented to present a pointed or narrow upper surface facing the circumferential pockets.

At least one embodiment further comprises at least one purge gas inlet located proximate at least one of the first feeder outlet and the second feeder outlet.

At least one embodiment further comprises a perforated divider providing fluid communication between the second feeder outlet and the first feeder outlet.

One class of embodiments comprises a rotary feeder for feeding a particulate material comprising: a cylindrical housing comprising a feeder inlet, and a feeder outlet; a rotor mounted in the cylindrical housing comprising a plurality of impeller blades defining a plurality of circumferentially spaced pockets alignable with the feeder inlet and feeder outlet, and adapted to sweep a wall of the cylindrical housing as the rotor rotates in the cylindrical housing, wherein each of the plurality of circumferentially spaced pockets will align with the feeder inlet to receive therein a particulate material and an oversize material from the feeder inlet, rotate through the cylindrical housing to align with the feeder outlet to discharge the particulate material and the oversize material therefrom; a device for driving the rotor; and a screening device in association with the feeder outlet, wherein the screening device comprises a first screener outlet, and a second screener outlet, and a separating screen, wherein the separating screen extends into the feeder outlet, and wherein the oversize material and the particulate material are discharged separately from the screening device.

In at least one embodiment, the separating screen substantially prevents oversize material from exiting through the first screener outlet.

One class of embodiments comprises a method of feeding a particulate material comprising the steps of: feeding a particulate material and an oversized material to a rotary feeder; rotating a plurality of circumferentially spaced pockets in the rotary feeder past a feeder inlet to allow the particulate material and the oversized material to enter the plurality of circumferentially spaced pockets; separating the oversized material and the particulate material in the rotary feeder; discharging the particulate material from a first feeder outlet; and discharging the oversized material from a second feeder outlet.

In at least one embodiment, the oversized material and the particulate material are separated in the rotary feeder by: rotating the plurality of circumferentially spaced pockets past a screen in the first feeder outlet that allows the particulate material to pass out through the first feeder outlet while preventing the oversize material from passing out of the first feeder outlet; and sweeping the oversized material to the second feeder outlet.

In at least one embodiment, the oversized material and the particulate material are separated in the rotary feeder by: rotating the plurality of circumferentially spaced pockets past a separating screen in the first feeder outlet that allows particulate material to pass through the screen; and sweeping the oversized material past the screen.

In at least one embodiment of the method, the rotary feeder comprises: a cylindrical housing comprising the feeder inlet, the first feeder outlet, and the second feeder outlet; and a rotor mounted in the cylindrical housing comprising the plurality of impeller blades defining the plurality of circumferentially spaced pockets sequentially alignable with the feeder inlet, first feeder outlet, and second feeder outlet, and adapted to sweep a wall of the cylindrical housing as the rotor rotates in the cylindrical housing.

In at least one embodiment, the oversized material is cut into smaller pieces by rotating the plurality of impeller blades in proximity to a first shear surface, or a second shear surface such that the oversized material is sheared between the first shear surface, or second shear surface and the plurality of impeller blades.

In at least one embodiment, the rotation of the rotor is temporarily reversed.

In at least one embodiment, the method further comprises feeding a purge gas through a purge gas inlet located proximate at least one of the first feeder outlet and the second feeder outlet.

In at least one embodiment, the method further comprises controlling a flow rate of a purge gas, from a purge gas inlet located proximate the second feeder outlet, to entrain at least a portion of any particulate material carried over into the second feeder outlet to the first feeder outlet through at least one of the perforated divider and the separating screen.

DETAILED DESCRIPTION

Before the present compounds, components, compositions, devices, softwares, hardwares, equipments, configurations, schematics, systems, and/or methods are disclosed and described, it is to be understood that unless otherwise indicated this invention is not limited to specific compounds, components, compositions, devices, softwares, hardwares, equipments, configurations, schematics, systems, methods, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified.

Generally, embodiments disclosed herein relate to a device and method for feeding a particulate material while, optionally, also separating oversized material that may be contained in the particulate material stream from the particulate material. In particular, the embodiments include a rotary feeder device and method of using a rotary feeder device for feeding a particulate material while separating an oversized material from the particulate material stream.

As used herein, the term "particulate material" refers to any divided material or any heterogeneous mixture. In any embodiment, the particulate material may comprise granular polymers, for example granular polyethylene polymers, polypropylene polymers, or other polymers.

As used herein, the term "oversized material" refers to material that is greater in size than the other material in a divided material or heterogeneous mixture. In any embodiment, the oversized material may comprise agglomerated particulate material. In any embodiment, the oversized material may by lumps of polymers, for example polyethylene polymers, polypropylene polymers, or other polymers, that have formed together by any means, for example, through melting and cooling of polymer particles, or may be agglomerates of polymer particles. For example, in any embodiment, the divided material may have an average particle size of between about 0.0127 to about 1.27 cm (0.005 to 0.50 inches), whereas the oversized material may be greater than 2.54 cm (1.0 inches) in length, width, and/or thickness. In other embodiments, the divided material may have an average particle size of between about 0.005 to about 0.508 cm (0.002 to 0.20 inches), whereas the oversized material may be greater than 1.27 cm (0.5 inches) in length, width, and/or thickness.

As used herein, "rotary feeder" refers to any drop-thru rotary feeder designed to feed solid material that has a housing with a top inlet and bottom outlet for the solid material and contains a rotor which rotates in the housing to transfer the solid material through the fixed housing. In some embodiments herein, the rotary feeder may be a rotary air-lock feeder wherein the rotor has blades that are positioned in close association with the housing wall to restrict the flow of gases through the feeder (either from inlet to outlet or from outlet to inlet) and from gasses escaping the feeder to the atmosphere or entering the feeder from the atmosphere. In any embodiment, the rotary feeder may be a rotary air-lock feeder such as that described in U.S. Pat. No. 4,231,495.

Figure 1:
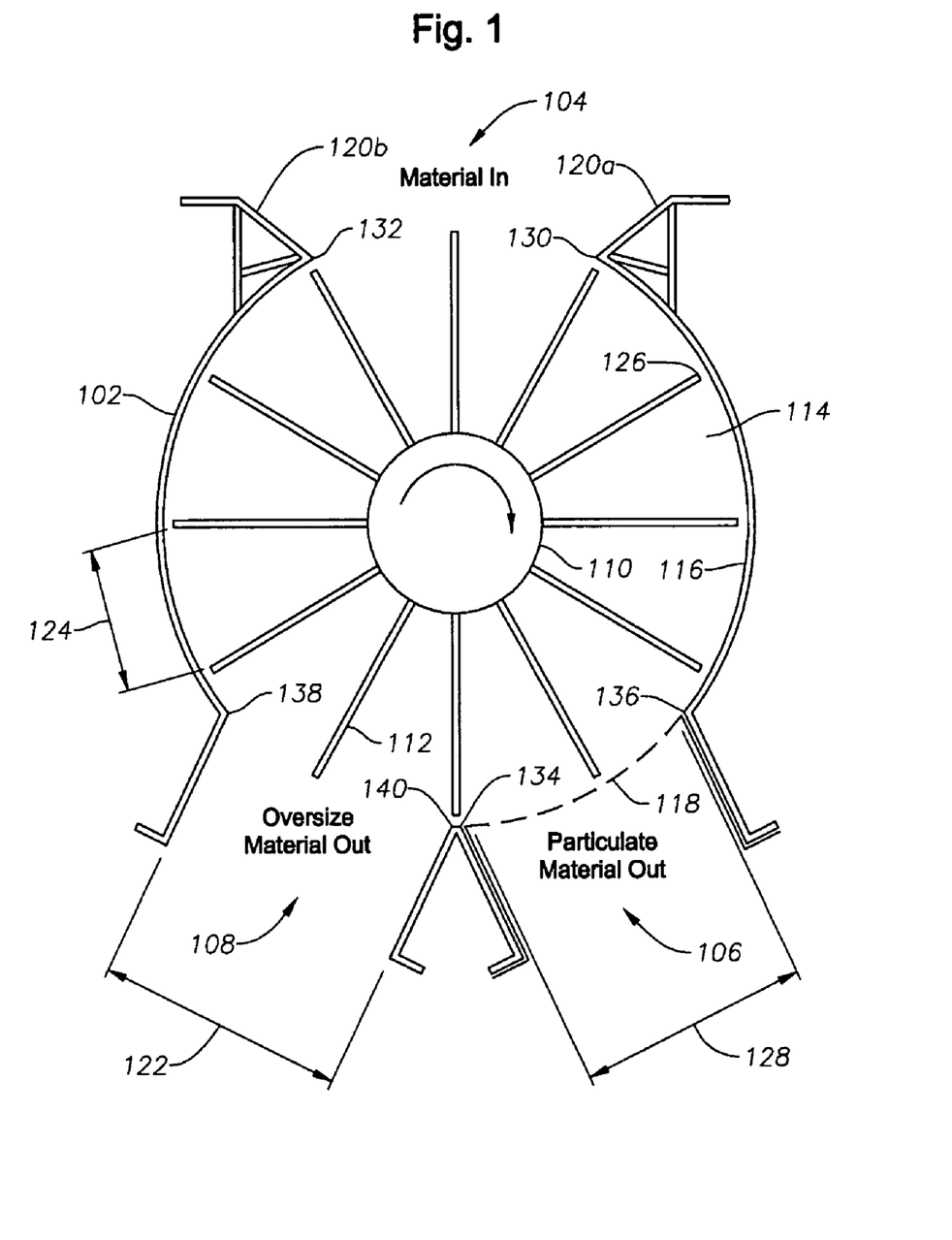
FIG. 1 is a cross-sectional view of a rotary feeder of one embodiment of the invention.

Referring to FIG. 1, one class of embodiments provides for a rotary feeder for feeding a particulate material comprising: a cylindrical housing 102 comprising a feeder inlet 104, a first feeder outlet 106, and a second feeder outlet 108; a rotor 110 mounted in the cylindrical housing 102 comprising a plurality of impeller blades 112 defining a plurality of circumferentially spaced pockets 114 alignable with the feeder inlet 104, first feeder outlet 106, and second feeder outlet 108, and adapted to sweep a wall 116 of the cylindrical housing 102 as the rotor 110 rotates in the cylindrical housing 102; a device (not shown) for rotating the rotor 110; and a separating screen 118 in the first feeder outlet 106 to substantially prevent oversize material from exiting through the first feeder outlet 106, wherein each of the plurality of circumferentially spaced pockets 114 will align with the feeder inlet 104 to receive therein a particulate material and an oversize material through the feeder inlet 104, rotate in the cylindrical housing 102 to align with the first feeder outlet 106 and discharge the particulate material therefrom, and rotate in the cylindrical housing 102 to align with the second feeder outlet 108 after alignment with the first feeder outlet 106 and discharge the oversized material therefrom.

In any of the embodiments herein, the cylindrical housing 102 may be formed with the feeder inlet 104 at its top and the first feeder outlet 106 and second feeder outlet 108 at its bottom. The cylindrical housing 102 may be mounted to a base (not shown) upon which the cylindrical housing 102 is mounted along with other rotary feeder parts, such as, for example, journal bearings, and/or the device for rotating the rotor.

In at least one embodiment, the feeder inlet 104 receives a particulate material stream by gravity feed. The feeder inlet 104 may also receive oversized material that is contained in the particulate material stream. The feeder inlet 104 may be sized according to the volume of particulate material coming onto the feeder, by the size of oversize material expected to enter the feeder, or a combination thereof. In at least one embodiment, the inlet 104 comprises inclined walls 120a, 120b, to facilitate feeding the particulate material and oversized material into the plurality of circumferentially spaced pockets 114.

In any embodiment, the first feeder outlet 106 receives particulate material from the plurality of circumferentially spaced pockets 114 and passes the particulate material to a conduit (not shown) that feeds the particulate material into downstream equipment. In one embodiment, the first feeder outlet 106 is in fluid communication with the plurality of circumferentially spaced pockets 114 and a particulate material conveying line (not shown).

In any embodiment, the second feeder outlet 108 may receive oversized material from the plurality of circumferentially spaced pockets 114 and pass the oversized material out of the feeder. In any embodiment, the second feeder outlet length 122 in the direction of rotation may be at least about 1.0 times a tip-to-tip distance 124 between any two adjacent rotor tips 126.

In at least one embodiment, the pressure in the first feeder outlet 106 and the second feeder outlet 108 are substantially equal. By having the pressure substantially equal, a gas seal is not required between the first feeder outlet 106 and second feeder outlet 108. In some embodiments, the second feeder outlet 108 may be at atmospheric pressure to allow the oversize material to be dropped into a hopper through a conduit (not shown) attached to the second feeder outlet 108. The conduit may have a valve (not shown) in the conduit that opens automatically or manually to dump oversize material accumulated in the conduit. Some embodiments may fluidly connect the first outlet 106 to an air-lock rotary feeder (not shown), which allows the particulate material to be fed into a system that is at higher or lower pressure than the first feeder outlet 106.

In any embodiment, the rotor 110 may comprise a plurality of impeller blades 112 defining a plurality of circumferentially spaced pockets 114. In some embodiments, the plurality of impeller blades 112 may extend radially from a rotor hub and parallel to the axis thereof. In other embodiments, the plurality of impeller blades 112 may be at a moderate angle (less than 30 degrees or less than 15 degrees to an axial line down the rotor shaft). In still other embodiments, the plurality of impeller blades 112 may be a herringbone design. In at least one embodiment, the rotor 110 is mounted within the cylindrical housing 102 and may be fixed to a rotor shaft (not shown) journaled in bearings (not shown) that are supported upon the base (not shown).

In at least one embodiment, the rotor 110 may comprise rotor tips 126 on the impeller blades 112 that may be straight and extend parallel to the axis of the rotor 110. In at least one embodiment, the rotor tips 126 are defined by adjustable and replaceable tip members (not shown) that are adjustably clamped in place to the impeller blades 112. The rotor tips 126 may be of rectangular configuration. The opposite longitudinal edges of the rotor tips 126 may be at right angles to the opposite faces, and may be adapted to be mounted on the blades 112 with such edges extending parallel to the axis of the rotor 110 and in close proximity to the inner wall 116 the cylindrical housing 102.

In at least one embodiment, the plurality of impeller blades 112 are mounted between rotor end plates (not shown) and are fixed at their inner edges to a rotor hub, which is supported coaxially on a shaft (not shown). The end plates and the plurality of impeller blades 112 form the plurality of circumferentially spaced pockets 114 for transferring material from the inlet 104 of the feeder to the first outlet 106 and second outlet 108. The engagement of the rotor tips 126 with the inner wall 116 of the cylindrical housing 102 prevents or restricts the passage of gases between the inlet 104 and the first outlet 106. In some embodiments, the rotor tips 126 also prevent or restrict the passage of gases between the inlet 104 and the second outlet 108. Under some conditions of operation, the first outlet 106 may be at a pressure above atmosphere and at other conditions the first outlet 106 may be at a pressure above atmosphere, depending upon the downstream equipment the feeder is feeding. Other seals, such as rotary seals (not shown), may be provided to form a seal between the end plates (not shown) and the adjacent housing end plates (not shown). In any embodiment, the plurality of circumferentially spaced pockets 114 may be alignable with the feeder inlet 104, first feeder outlet 106, and second feeder outlet 108, and the rotor 110, or rotor tips 126, may be adapted to sweep a wall 116 of the cylindrical housing 102 as the rotor 110 rotates in the cylindrical housing 102.

Any embodiment herein may comprise a device for rotating the rotor 110. The device for rotating the rotor 110 may comprise a chain or belt drive attached to a rotor shaft and driven by an electric or hydraulic motor, a direct electric drive or hydraulic drive attached to the rotor shaft, or other suitable means of rotating equipment. In any embodiment, the device for rotating the rotor 110 may allow the speed of the rotor 110 to be varied. In at least one embodiment, the device for rotating the rotor 110 may allow the rotor 110 to be turned in a forward and a reverse direction either manually or automatically in response to high torque required to turn the rotor 110. In some embodiments, the electric or hydraulic drive is sized with sufficient power to cut the oversize material that is expected in the system. In some embodiments, the electric or hydraulic drive may develop from about 15 hp to 50 hp, and in others greater than 50 hp.

Any embodiment of the invention may comprise a separating screen 118 in the first feeder outlet 106 to substantially prevent oversize material from exiting through the first feeder outlet 106. The separating screen 118 may be any means that is suitable to pass the particulate material out of the first feeder outlet 106 while the oversize material remains in the plurality of circumferentially spaced pockets 114. The separating screen 118 allows the particulate material to fall through the screen 118 while the oversize material is swept over the screen 118 to the second feeder outlet 108. As used herein, the term "separating screen" refers to any suitable surface for separating oversize material from the particulate material. In some embodiments, the separating screen comprises a bar grate, perforated surface, or a meshed wire mounted and used to separate coarser from finer parts. In at least one embodiment, the separating screen 118 may comprise a bar grate that comprises a series of parallel bars placed in the same direction as the rotor 112 rotates, parallel to the direction of travel of the rotor tips 126, or at any angle in between perpendicular and parallel to the direction of the travel of the rotor tips 126. In at least one embodiment, the separating screen 118 may be in close proximity to the rotor tips 126. In at least one embodiment, the separating screen 118 comprises a bar grate that is self-cleaning. For example, the self-cleaning bar grate may allow the motion of the rotor tips 126 across the surface of the bar grate to push oversize material on the surface of the bar grate, or partially through the bar grate, to the second feeder outlet 108.

In at least one embodiment, each of the plurality of circumferentially spaced pockets 114 will align with the feeder inlet 104 to receive therein a particulate material and an oversize material through the feeder inlet, rotate in the cylindrical housing 102 to align with the first feeder outlet 106 and discharge the particulate material therefrom. Then, after discharging substantially all of the particulate material through the first outlet 106, the oversized material will remain in the plurality of circumferentially spaced pockets 114 and be swept to the second feeder outlet 108 and discharged from the feeder as the plurality of circumferentially spaced pockets 114 align with the second feeder outlet 108. In some embodiments, the direction of rotor 110 rotation may be temporarily reversed to cut large pieces of oversized material that may be lodged in the inlet 104. When the direction of rotation reverses, particulate material may be discharged from the second feeder outlet 108 along with the oversized material. Thus, in some embodiments, it may be desirable to minimize the amount of time the rotor 110 rotates in the reverse direction.

In any embodiment herein, purge nozzles (not shown) may be placed on the cylindrical housing 102 just above the first feeder outlet 106 and/or the second feeder outlet 108 to allow a gas to be injected into the plurality of circumferentially spaced pockets 114 to aid in causing the particulate material to drop out of the pockets 114.

In any embodiment herein, the separating screen 118 may be about the same width as the length of the plurality of radially disposed blades 112. The separating screen 118 may be of a screen length in the direction of rotation sufficient to allow substantially all of the particulate material contained in the plurality of circumferentially spaced pockets 114 to fall through the separating screen 118 and into the feeder outlet 106. In at least one embodiment, a screen length 128 in the direction of rotation may be at least about 1.5 times a tip-to-tip distance 124 between any two adjacent rotor tips 126 on the plurality of radially disposed blades 112.

Any embodiment may comprise a first shear surface 130 on the cylindrical housing 102 at the feeder inlet 104 for engagement with the edges of the impeller blades 112 as the rotor 110 rotates in a first direction (forward direction), a second shear surface 132 on the cylindrical housing 102 at the feeder inlet 104 for engagement with the edges of the impeller blades 112 as the rotor 110 rotates in a second direction (reverse direction), or a combination thereof. In some embodiments, the shear surfaces 130, 132 may be shear knives provided with a base portion adapted to seat upon seating surfaces formed in the cylindrical housing 102. The shear knives may include a body portion having an arcuate inner surface that is substantially concentric with the axis of the rotor 110 and the housing 102 but is slightly eccentric therefrom. The shear knives may be mounted on the cylindrical housing 102 with the edge extending parallel to the axis of rotation of the rotor 110 and closely adjacent to the path of the outer edges of the rotor tips 126. In other embodiments, the first shear surface 130 or second shear surface 132 may be a surface of the cylindrical housing 102 in close proximity to the rotor tips 126, or a removable shear surface attached to the cylindrical housing 102 in close proximity to the rotor tips 126.

In other embodiments, the rotary feeder may comprise a third shear surface 134 on the cylindrical housing 102 at the first feeder outlet 106 for engagement with the edges of the impeller blades 112 as the rotor 110 rotates in the first direction, a fourth shear surface 136 on the cylindrical housing at the first feeder outlet 106 for engagement with the edges of the impeller blades 112 as the rotor 110 rotates in the second direction, or a combination thereof. In some embodiments, the shear surfaces 134, 136 may be of similar design as described above for the first and second shear surfaces 130, 132. In other embodiments, the third shear surface 134 or fourth shear surface 136 may be a surface of the screen 118.

In some embodiments, the rotary feeder may comprise a fifth shear surface 138 on the cylindrical housing 102 at the second feeder outlet 108 for engagement with the edges of the impeller blades 112 as the rotor 110 rotates in the first direction, a sixth shear surface 140 on the cylindrical housing 102 at the second feeder outlet 108 for engagement with the edges of the impeller blades 112 as the rotor 110 rotates in the second direction, or a combination thereof. The shear surfaces 138, 140 may be of similar design as described above for the first and second shear surfaces 130, 132.

Still referring to FIG. 1, another class of embodiments provides a method of feeding a particulate material comprising the steps of: feeding a particulate material and an oversized material to a rotary feeder; rotating a plurality of circumferentially spaced pockets 114 in the rotary feeder past a feeder inlet 104 to allow the particulate material and the oversized material to enter the plurality of circumferentially spaced pockets 114; separating the oversized material and the particulate material in the rotary feeder; discharging the particulate material from a first feeder outlet 106; and discharging the oversized material from a second feeder outlet 108.

The oversized material and particulate material may be separated in the rotary feeder by any suitable means that is adaptable to the rotary feeder. In at least one embodiment, the oversized material and the particulate material are separated in the rotary feeder by: rotating the plurality of circumferentially spaced pockets 114 past a separating screen 118 in the first feeder outlet 106 that allows particulate material to pass out through the first feeder outlet 106 while preventing the oversize material from passing out of the first feeder outlet 106; and sweeping the oversized material to the second feeder outlet 106. In at least one embodiment, the plurality of circumferentially spaced pockets 114 rotate sequentially past the first outlet 106 and then past the second outlet 108. Thus, the particulate matter discharges from the plurality of circumferentially spaced pockets 114 as the pockets pass the first outlet 106, while the oversized material stays in the pockets 114 to be swept to the second outlet 108. In one embodiment, the flow of particulate and oversize material into the inlet 104 and out of the first outlet 106 and the second outlet 108 is by gravity.

In at least one embodiment, the oversized material and the particulate material are separated in the rotary feeder by: rotating the plurality of circumferentially spaced pockets 114 past a screen in the first feeder outlet 106 that allows particulate material to pass through the separating screen 118; and sweeping the oversized material past the screen. The separating screen 118 may be any suitable screen as described hereinabove.

In at least one embodiment, oversized material may be cut into smaller pieces by rotating the plurality of impeller blades 112 in proximity to a first shear surface 130 or a second shear surface 132, such that the oversized material is sheared between the first shear surface 130 or second shear surface 132 and the plurality of impeller blades 112.

In at least one embodiment, the rotation of the rotor 110 may be temporarily reversed. The rotation is typically reversed in response to an attempt of the feeder to cut a piece of oversized material that is not fully contained in one of the plurality of circumferentially spaced pockets 114 and is not easily cut by the first shearing surface 130. In this case, the rotor 110 may experience higher than usual torque requirements. Reversing the rotation aids the feeder in cutting the larger oversized material without damage or stalling of the rotary feeder.

Figure 2:
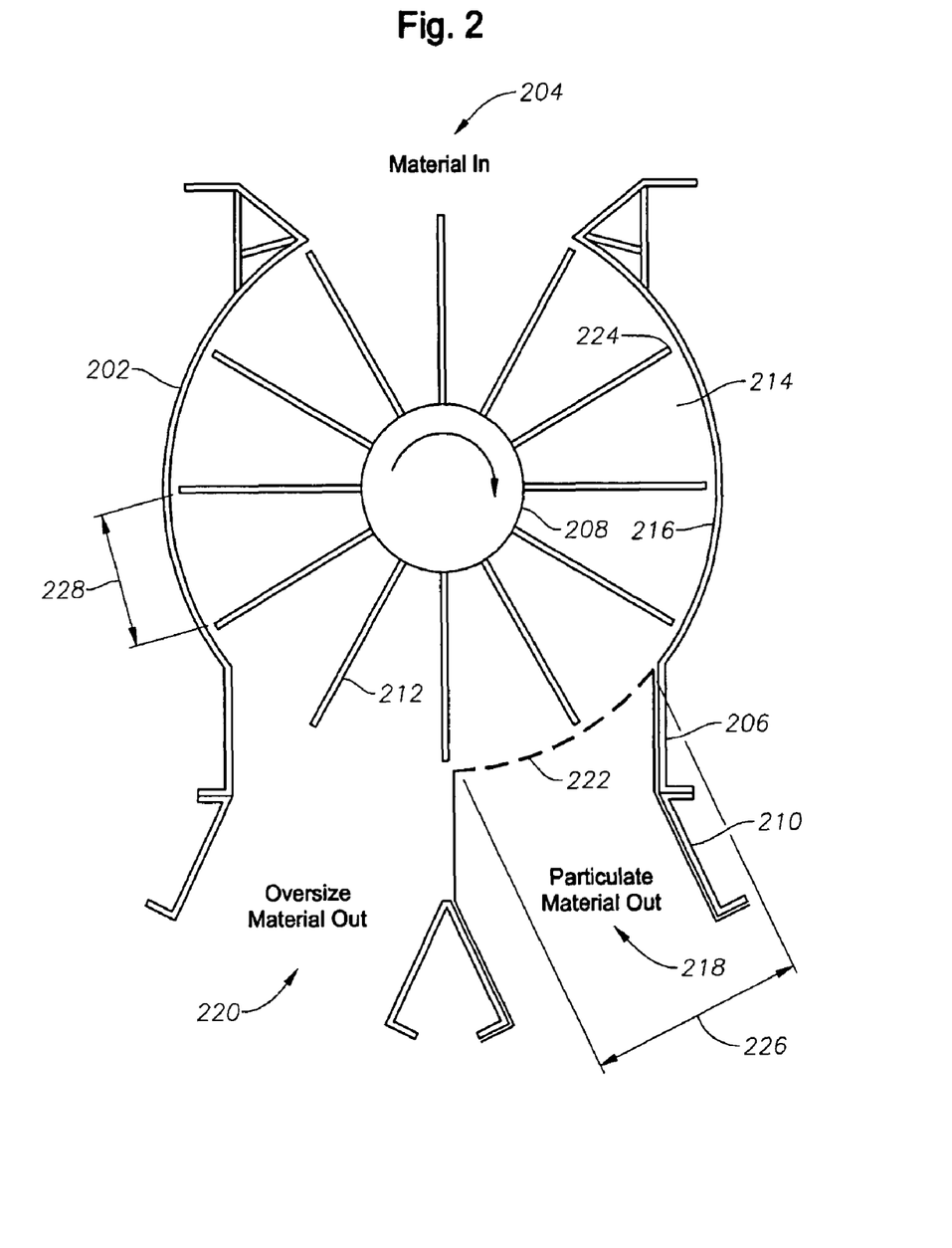
FIG. 2 is a cross-sectional view of a rotary feeder of another embodiment of the invention.

Now referring to FIG. 2, one class of embodiments provides a rotary feeder for feeding a particulate material comprising: a cylindrical housing 202 comprising a feeder inlet 204, and a feeder outlet 206; a rotor 208 mounted in the cylindrical housing 202 comprising a plurality of impeller blades 212 defining a plurality of circumferentially spaced pockets 214 alignable with the feeder inlet 204 and feeder outlet 206, and adapted to sweep a wall 216 of the cylindrical housing as the rotor 208 rotates in the cylindrical housing 202, wherein each of the plurality of circumferentially spaced pockets 214 will align with the feeder inlet 204 to receive therein a particulate material and an oversize material from the feeder inlet 204, rotate through the cylindrical housing 202 to align with the feeder outlet 206 to discharge the particulate material and the oversize material therefrom; a device for driving the rotor 208; and a screening device 210 in association with the feeder outlet 206, wherein the screening device 210 comprises a first screener outlet 218, and a second screener outlet 220, and a separating screen 222, wherein the separating screen 222 extends into the feeder outlet 206, and wherein the oversize material and the particulate material are discharged separately from the screening device 210.

In at least one embodiment, the screening device 210 may be directly connected to or in fluid association with the feeder outlet 206. The screening device 210 may comprise a first screener outlet 218, and a second screener outlet 220, and a separating screen 222. In at least one embodiment the separating screen 222 may extend into the feeder outlet 206. Thus, the oversize material and the particulate material are discharged separately from the screening device 210. In at least one embodiment, the screening device 210 extends into the feeder outlet 206 such that the separating screen 222 is in close proximity to rotor tips 224 of the plurality of impeller blades 212. In other embodiments, the separating screen 222 could be inserted through the first screener outlet 218 or sandwiched between the feeder outlet 206 and the screening device 210.

In at least one embodiment, the separating screen 222 may be about the same width as the width of the plurality of radially disposed blades 212. The separating screen 222 may be of a screen length 226 in the direction of rotation sufficient to allow substantially all of the particulate material contained in the plurality of circumferentially spaced pockets 214 to fall through the separating screen 222 when the plurality of circumferentially spaced pockets 214 pass by the separating screen 222. In at least one embodiment, a screen length 226 in the direction of rotation is at least about 1.5 times a tip-to-tip distance 228 between any two adjacent rotor tips 224 on the plurality of radially disposed blades 212.

In at least one embodiment, each of the plurality of circumferentially spaced pockets 214 will align with the feeder inlet 204 to receive therein a particulate material and an oversize material through the feeder inlet 204, rotate in the cylindrical housing 202 to align with the feeder outlet 206. As the circumferentially spaced pockets 214 pass the separating screen 222, substantially all or all of the particulate material may drop out through the first screener outlet 218, while the oversized material will remain in the plurality of circumferentially spaced pockets 214 and be swept to the second screener outlet 220 and discharged from the system therethrough.

Figure 3A:
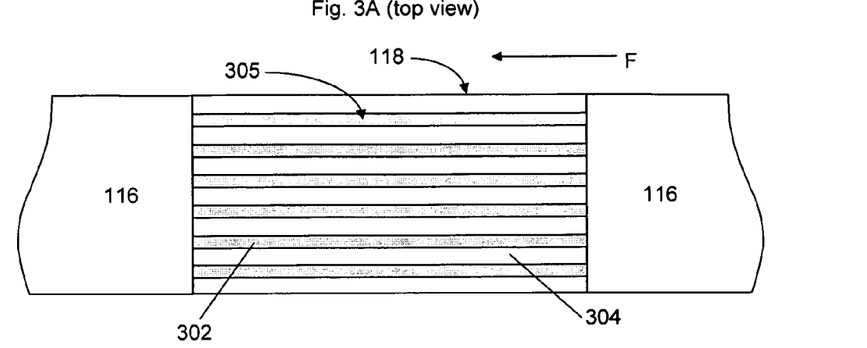
FIGS. 3 and 4 are schematic diagrams of separating screens, and components thereof, useful in embodiments of the rotary separator valves disclosed herein.
Figure 3B:
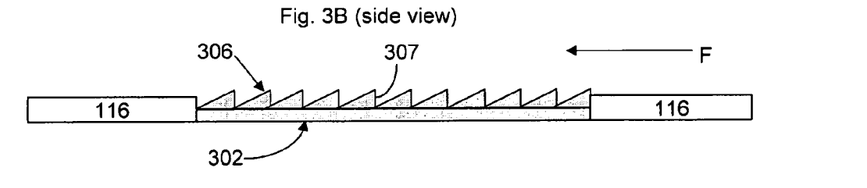

As mentioned above, separating screens useful in embodiments disclosed herein may include bar grates, allowing particulate matter to pass through and to prevent oversize material from passing through. Referring now to FIGS. 1 and 3A, where like numerals represent like parts, a separating screen comprising bar grates according to embodiments disclosed herein is illustrated, where the bar grates include a series of parallel bars placed in the same direction as rotor 112 rotates. In any embodiment, a separating screen 118 may include bar grates 302 extending across first outlet 106 in proximity to wall 116 of cylindrical housing 112. Voids 304 between bar grates 302 may allow for the passage of particulate matter through separating screen 118 to first outlet 106. Bar grates 302 may be of any cross-sectional shape, including square, circular, ovoid, and rectangular, among other shapes.

Rotation of impeller blades 112 in the forward direction of rotation F may push oversize material across the surface of bar grates 302 to the second feeder outlet 108. Further, depending upon the shape of the oversize material, rotation of impeller blades 112 may result in a pushing a portion of the oversize material partially through the grate. When in such proximity to bar grates 302, the volume occupied by the oversize materials may hinder transport of particulate materials through voids 304. For example, particulate materials may be carried by oversize materials or may be plowed along a top surface 305 of bar grates 302 to second feeder outlet 108, decreasing the separation efficiency of the separator rotary valve.

Figure 3C:
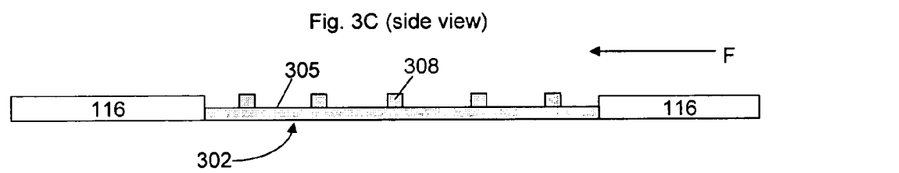
Figure 3D:
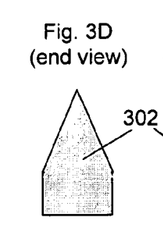
Figure 3E:
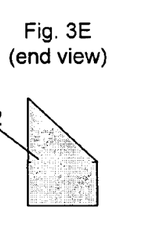
Figures 3F, 3G:
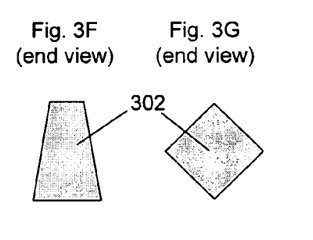

FIGS. 3B-3G present several examples of bar grates 302 that may prevent, minimize, or decrease the amount of particulate material carryover due to plowing, carrying, or other effects caused by oversize material. For example, in FIG. 3B, the upper surface 305 of a bar grate 302 may be serrated. Serrations 306 may provide a leading edge 307, which may cause the oversize material to tumble as they are pushed across bar grates 302. Due to the tumbling effect, carrying of particulate material by the oversize material may be reduced and transport of particulate material through voids 304 may be enhanced. Similarly, as illustrated in FIG. 3C, nodules 308 or other projections extending upward from upper surface 305 may create the desired tumbling effect.

In addition to carrying, as described above, particulate material may also settle onto upper surface 305, and may be pushed or plowed across bar grates 302 to second feeder outlet 108, such as by oversize material or by impeller blades 112/rotor tips 126. Within limitations of screen separator 118 service life requirements, manufacturability, and other concerns, presentation of a limited upper surface 305 surface area upon which particulate matter may be plowed across bar grates may enhance the separation of particulate material through screen separator 118. For example, bar grates 302 having a cross-sectional profile such as pentagonal (e.g., FIG. 3D, for example), rhomboidal (e.g., FIGS. 3E and 3F, for example), or diamond/kite (e.g., FIG. 3G, for example) may be used to present a low surface area upon which settling and plowing may occur. Other various shapes having a pointed or narrow upper extremity may also be used.

Figure 4:
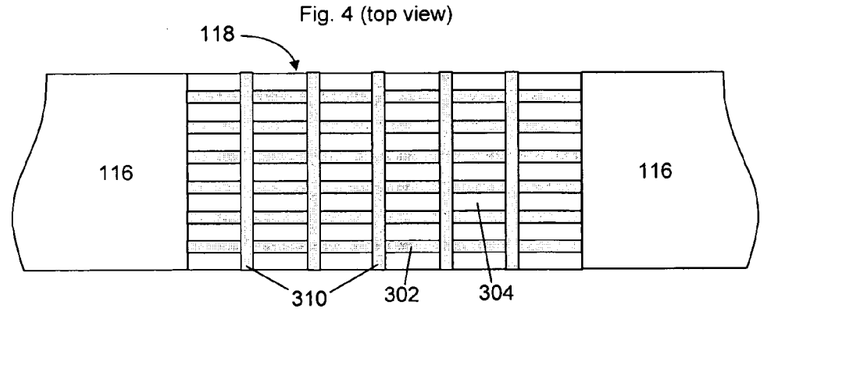

Referring now to FIG. 4, in addition to the bar grates 302, cross-bars 310 may also be used. Cross-bars 310 may be located above, below, or of even height to bar grates 302. Cross-bars 310, for example, may prevent flat or thin oversize material from passing through voids 304. Additionally, cross-bars 310 may induce tumbling of the oversize material. For example, cross-bars 310 disposed on upper surface 305 may induce tumbling similar to nodules 308, described above. Likewise, cross-bars 310 located of even height or below bar grates 302 may induce tumbling of oversize materials partially passing through bar grates 302.

Figure 5:
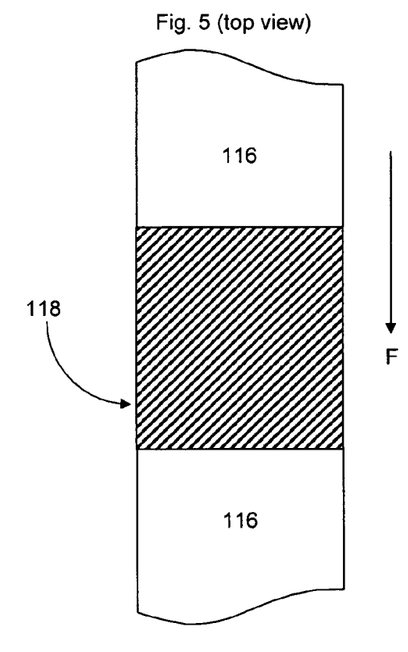
FIGS. 5-8 are simplified schematic drawings (top view) of separating screens useful in embodiments of the rotary separator valves disclosed herein.
Figure 6:
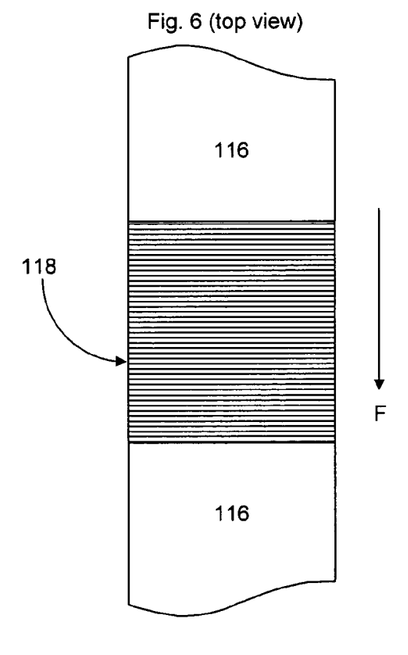

Carry over of particulate matter due to carrying and plowing may additionally be addressed by use of bar grates disposed at an angle transverse to the direction of rotation of rotor 112, such as illustrated in FIGS. 5 and 6.

Figure 7:
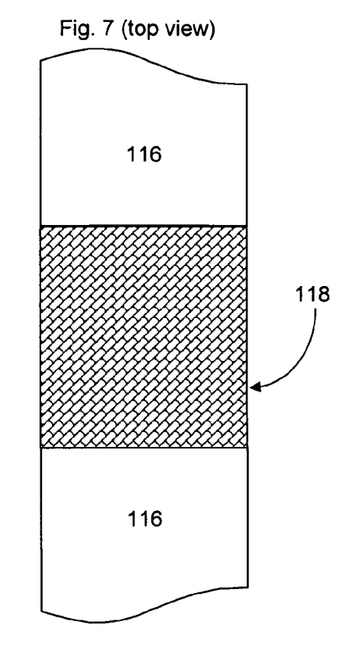
Figure 8:
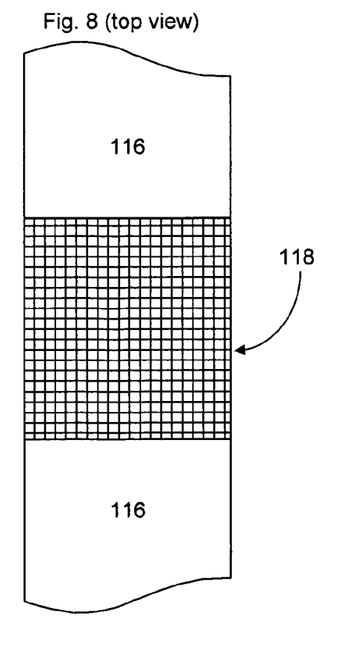

Screens, perforated surfaces, wire mesh, and other devices may also be used as a separating screen 118. For example, a wire mesh screen may include square, rectangular, or other shaped voids, that may be oriented parallel or transverse to the direction of rotation of rotor 112, such as illustrated in FIGS. 7 and 8.

Figure 9:
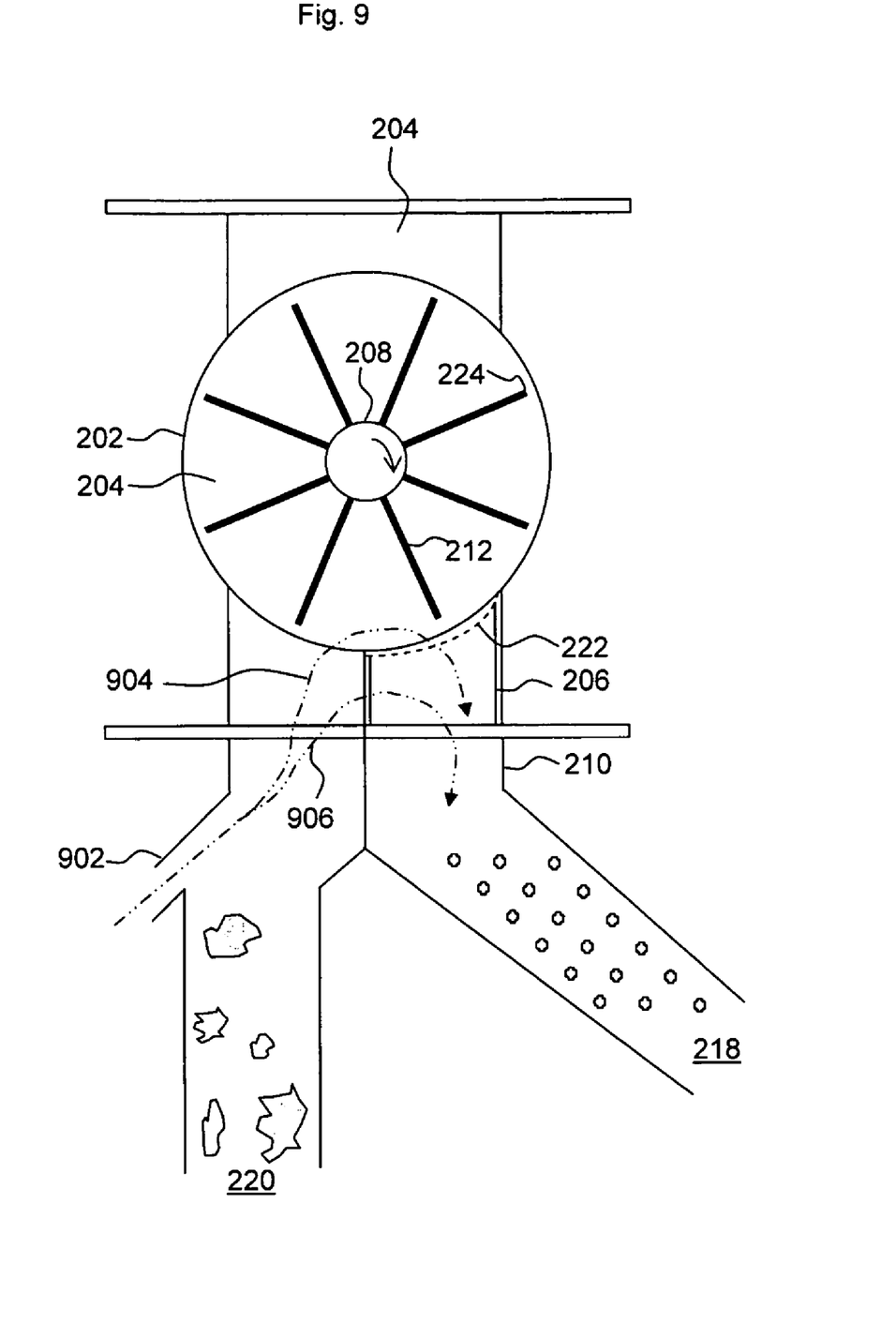
FIG. 9 is a cross-sectional view of a rotary separator valve according to embodiments disclosed herein.

As mentioned above, rotary separator valves according to embodiments disclosed herein may also include purge nozzles allowing for a gas to be injected into the pockets formed between the impeller blades, to aid in causing the particulate materials to drop out of the pockets. One such example of use of purge nozzles in association with rotary separator valves according to embodiments disclosed herein is illustrated in FIG. 9, where like numerals represent like parts. Use of such purge nozzles may additionally enhance the separation of particulate material from oversize material.

For example, one or more purge nozzles 902 may be located proximate to second feeder outlet 220. Second feeder outlet 220 may be at a higher pressure than first feeder outlet 218, thus providing for a flow of gas from purge nozzle 902, upward through second feeder outlet 220 and into first feeder outlet 218.

As rotor 208 is rotated in the forward direction, a gas from purge nozzle 902 may enter pocket 214, flowing through separating screen 222 into outlet 218, such as illustrated via flow line 904. The resulting flow eddies may cause the particulate material and the oversize material within pocket 214 to stir and flow, enhancing separations achieved across the separating screen 222 and thus resulting in less carry-over of particulate matter due to carrying and plowing.

Gas flow provided via purge nozzle 902 may also be used to capture particulate matter that may have been carried beyond separating screen 222 and into the portion of feeder outlet 206 in communication with second screener outlet 220. For example, the flow rate of purge gas may be of sufficient velocity to sweep carry-over particulate material in second screener outlet 220 back through separating screen 222 or through perforations in dividing wall 906 into first screener outlet 218. The gas velocity may be set, for example, at a linear velocity greater than a terminal velocity of the particulate material and less than a terminal velocity of the oversize material, thus entraining only particulate material and allowing the oversize material to continue flowing through second screener outlet 220.

The phrases, unless otherwise specified, "consists essentially of" and "consisting essentially of" do not exclude the presence of other steps, elements, or materials, whether or not, specifically mentioned in this specification, as along as such steps, elements, or materials, do not affect the basic and novel characteristics of the invention, additionally, they do not exclude impurities normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A rotary feeder for feeding a particulate material comprising:
    a) a cylindrical housing comprising a feeder inlet, a first feeder outlet, and a second feeder outlet;
    b) a rotor mounted in the cylindrical housing comprising a plurality of impeller blades defining a plurality of circumferentially spaced pockets alignable with the feeder inlet, first feeder outlet, and second feeder outlet, and adapted to sweep a wall of the cylindrical housing as the rotor rotates in the cylindrical housing;
    c) a device for rotating the rotor; and
    d) a separating screen in the first feeder outlet to substantially prevent oversize material from exiting through the first feeder outlet, wherein the separating screen comprises a bar grate,
wherein each of the plurality of circumferentially spaced pockets will align with the feeder inlet to receive therein a particulate material and an oversize material through the feeder inlet, rotate in the cylindrical housing to align with the first feeder outlet and discharge the particulate material therefrom, and rotate in the cylindrical housing to align with the second feeder outlet after alignment with the first feeder outlet and discharge the oversized material therefrom.

2. The rotary feeder of claim 1, wherein a screen length in the direction of rotation is at least about 1.5 times a tip-to-tip distance between any two adjacent rotor tips on the plurality of radially disposed blades.

3. The rotary feeder of claim 1, wherein a second outlet length in the direction of rotation is at least about 1.0 times the tip-to-tip distance between any two adjacent rotor tips on the plurality of radially disposed impeller blades.

4. The rotary feeder of claim 1, comprising a first shear surface on the cylindrical housing at the feeder inlet for engagement with the edges of the impeller blades as the impeller rotates in a first direction, a second shear surface on the cylindrical housing at the feeder inlet for engagement with the edges of the impeller blades as the impeller rotates in a second direction, or a combination thereof.

5. The rotary feeder of claim 4, further comprising a third shear surface on the cylindrical housing at the first feeder outlet for engagement with the edges of the impeller blades as the impeller rotates in a first direction, a fourth shear surface on the cylindrical housing at the first feeder outlet for engagement with the edges of the impeller blades as the impeller rotates in a second direction, or a combination thereof.

6. The rotary feeder of claim 1, wherein the bar grate comprises a series of parallel bars aligned in the same direction as the rotor rotates.

7. The rotary feeder of claim 6, wherein the parallel bars comprise at least one of nodules and serrations on an upper surface thereof.

8. The rotary feeder of claim 6, the bar grate further comprising bars aligned transverse to the direction of rotor rotation.

9. The rotary feeder of claim 6, wherein the parallel bars have a cross-sectional shape comprising at least one of pentagonal, rhomboidal, diamond, and kite, and are oriented to present a pointed or narrow upper surface facing the circumferential pockets.

10. The rotary feeder of claim 1, further comprising at least one purge gas inlet located proximate at least one of the first feeder outlet and the second feeder outlet.

11. The rotary feeder of claim 10, further comprising a perforated divider providing fluid communication between the second feeder outlet and the first feeder outlet.

12. A method of feeding a particulate material comprising the steps of:
    a) feeding a particulate material and an oversized material to the rotary feeder of claim 1;
    b) rotating a plurality of circumferentially spaced pockets in the rotary feeder past a feeder inlet to allow the particulate material and the oversized material to enter the plurality of circumferentially spaced pockets;
    c) separating the oversized material and the particulate material in the rotary feeder;
    d) discharging the particulate material from a first feeder outlet; and
    e) discharging the oversized material from a second feeder outlet.

13. The method of claim 12, wherein the oversized material and the particulate material are separated in the rotary feeder by:
    a) rotating the plurality of circumferentially spaced pockets past a separating screen in the first feeder outlet that allows the particulate material to pass out through the first feeder outlet while preventing the oversize material from passing out of the first feeder outlet; and b) sweeping the oversized material to the second feeder outlet.

14. The method of claim 12, further comprising the step of cutting the oversized material into smaller pieces by rotating the plurality of impeller blades in proximity to a first shear surface, or a second shear surface such that the oversized material is sheared between the first shear surface or second shear surface and the plurality of impeller blades.

15. The method of claim 12, wherein the rotation of the rotor is temporarily reversed.

16. The method of claim 12, wherein the rotary feeder comprises at least one purge gas inlet located proximate to the at least one first feeder outlet and the second feeder outlet, and the method further comprises feeding a purge gas through a purge gas inlet located proximate the second feeder outlet.

17. The method of claim 16, further comprising controlling a flow rate of the purge gas to entrain at least a portion of any particulate material carried over into the second feeder outlet to the first feeder outlet through the separating screen.

18. The method of claim 16, wherein the rotary feeder further comprises a perforated divider providing fluid communication between the second feeder outlet and the first feeder outlet, and the method further comprises feeding a purge gas through a purge gas inlet located proximate the second feeder outlet.

19. The method of claim 18, further comprising controlling a flow rate of the purge gas to entrain at least a portion of any particulate material carried over into the second feeder outlet to the first feeder outlet through at least one of the perforated divider and the separating screen.

20. A rotary feeder for feeding a particulate material comprising:

a) a cylindrical housing comprising a feeder inlet and a feeder outlet;

b) a rotor mounted in the cylindrical housing comprising a plurality of impeller blades defining a plurality of circumferentially spaced pockets alignable with the feeder inlet and feeder outlet, and adapted to sweep a wall of the cylindrical housing as the rotor rotates in the cylindrical housing, wherein each of the plurality of circumferentially spaced pockets will align with the feeder inlet to receive therein a particulate material and an oversize material from the feeder inlet, rotate through the cylindrical housing to align with the feeder outlet to discharge the particulate material and the oversize material therefrom;

c) a device for driving the rotor; and d) a screening device in association with the feeder outlet, wherein the screening device comprises a first screener outlet, and a second screener outlet, and a separating screen, wherein the separating screen comprises a bar grate and wherein the separating screen extends into the feeder outlet, and wherein the oversize material and the particulate material are discharged separately from the screening device.

21. The rotary feeder of claim 20, wherein the separating screen substantially prevents oversize material from exiting through the first screener outlet.

22. The rotary feeder of claim 20, comprising a first shear surface on the cylindrical housing at the feeder inlet for engagement with the edges of the impeller blades as the impeller rotates in a first direction, a second shear surface on the cylindrical housing at the feeder inlet for engagement with the edges of the impeller blades as the impeller rotates in a second direction, or a combination thereof.

23. The rotary feeder of claim 22, further comprising a third shear surface on the cylindrical housing at the first feeder outlet for engagement with the edges of the impeller blades as the impeller rotates in a first direction, a fourth shear surface on the cylindrical housing at the first feeder outlet for engagement with the edges of the impeller blades as the impeller rotates in a second direction, or a combination thereof.

24. The rotary feeder of claim 20, wherein the bar grate comprises a series of parallel bars aligned in the same direction as the rotor rotates.

25. The rotary feeder of claim 24, the bar grate further comprising bars aligned transverse to the direction of rotor rotation.

26. The rotary feeder of claim 24, wherein the parallel bars have a cross-sectional shape comprising at least one of pentagonal, rhomboidal, diamond, and kite, and are oriented to present a pointed or narrow upper surface facing the circumferential pockets.

27. The rotary feeder of claim 20, further comprising at least one purge gas inlet located proximate at least one of the first feeder outlet and the second feeder outlet.

28. The rotary feeder of claim 27, further comprising a perforated divider providing fluid communication between the second feeder outlet and the first feeder outlet.

* * * * *